June 23, 1970    O. BETZLER    3,516,463
MACHINE FOR COPYING AND LONGITUDINALLY MACHINING WORKPIECES
Filed April 29, 1968    4 Sheets-Sheet 3

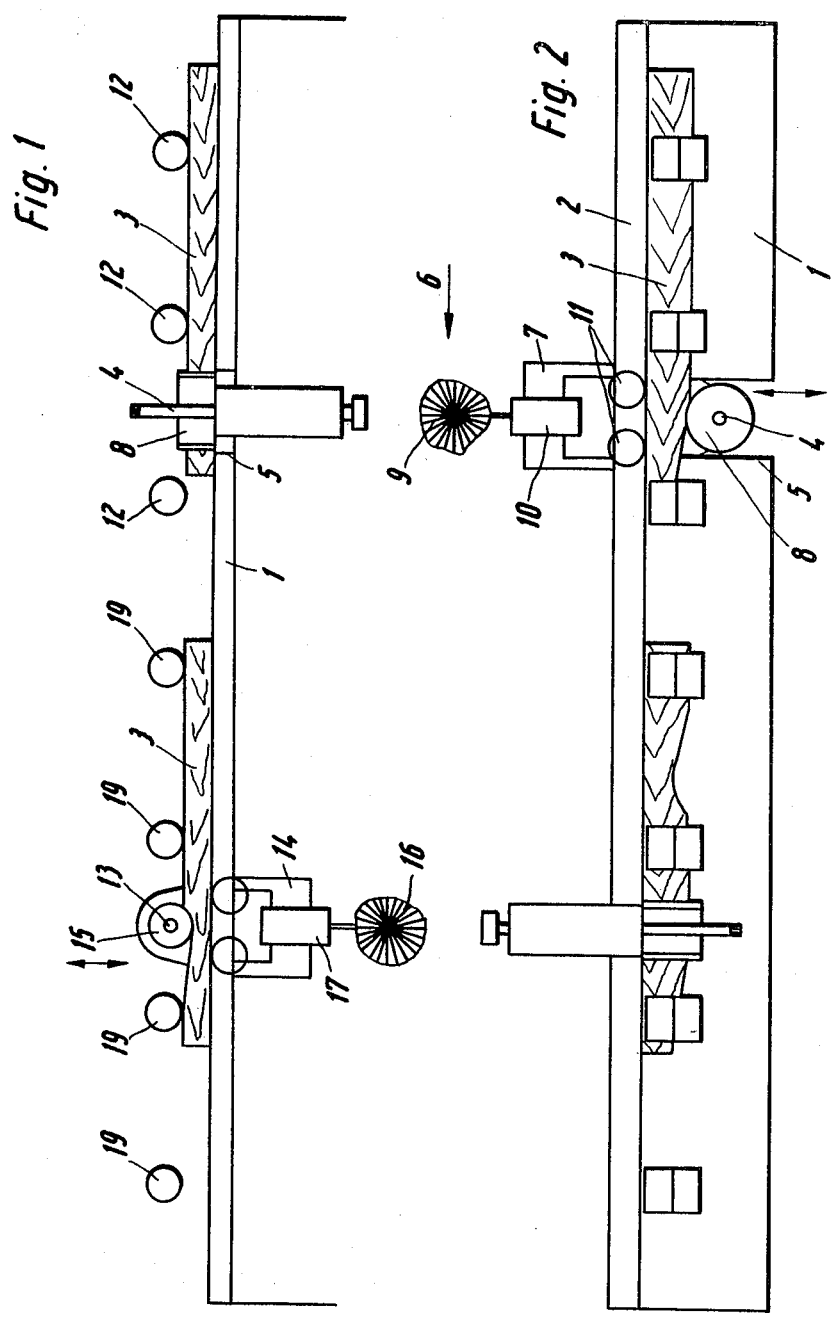

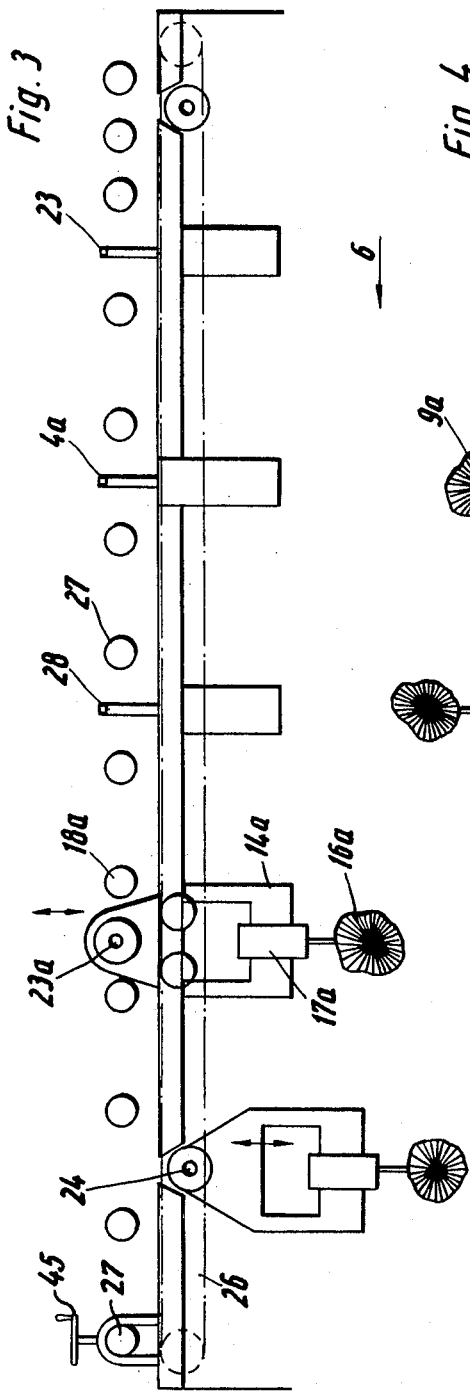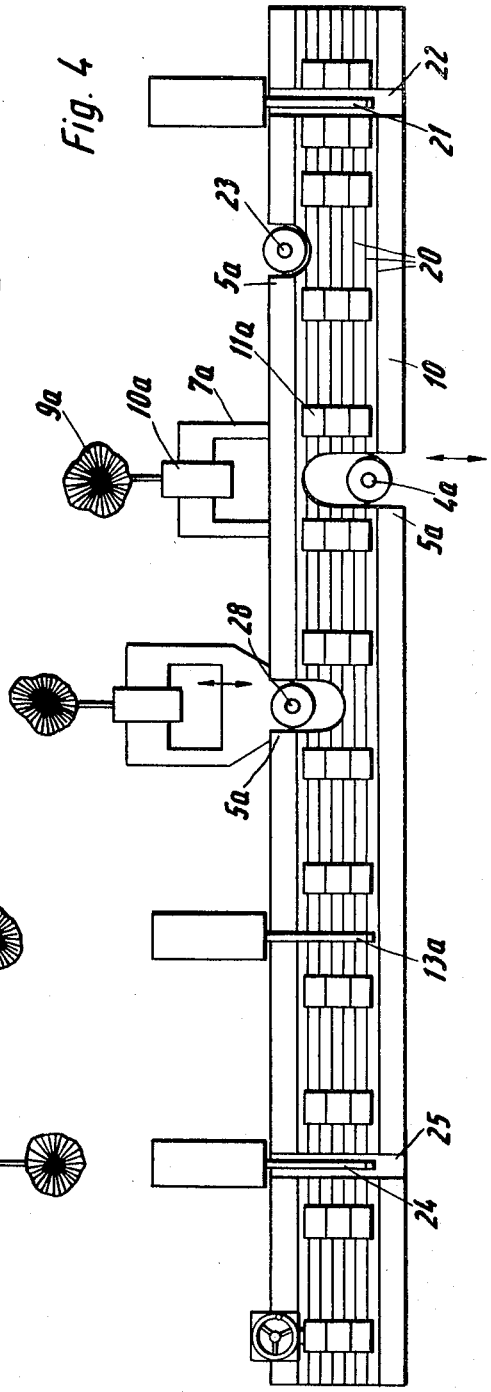

Inventor:
Otto Betzler
By

United States Patent Office 3,516,463
Patented June 23, 1970

3,516,463
MACHINE FOR COPYING AND LONGITUDINALLY MACHINING WORKPIECES
Otto Betzler, Tauberbischofsheim, Germany, assignor to Michael Weinig KG., Tauberbischofsheim, Germany
Filed Apr. 29, 1968, Ser. No. 725,077
Claims priority, application Germany, Apr. 28, 1967, W 43,866
Int. Cl. B27c 5/04
U.S. Cl. 144—144          21 Claims

ABSTRACT OF THE DISCLOSURE

Apparatus for profiling rail-like members, such as wood rails, which includes a table over which the rails are advanced in the direction of their length. At least one headstock with a spindle is positioned adjacent the path of the rail members and with a tool on the spindle for cutting the workpiece. A template and servomotor controls the movement of the headstock toward and away from the workpiece being machined and the templates is moved by a drive mechanism that includes a roller engaging the rail being machined so as to be driven thereby.

---

The present invention relates to a machine for copying and longitudinally machining workpieces of wood and similar material with at least one working spindle within the workpiece receiving range, in which the copying movement of the spindle is controlled by a movable templet through the intervention of a control device controlled by a feeler.

Machines have become known which are adapted stationarily to carry out a bilateral coping machining of the workpiece. These heretofore known machines have the drawback that the raw workpieces first have to be preplaned bilaterally to a certain thickness whereupon they are clamped onto a templet and machined individually.

In this connection, the workpiece which is mounted on a carriage is moved along the tools. It is also possible to have the templet stand still and to move the tool along the templet. After the machining has been completed, the machined workpiece is withdrawn from the clamping device in a time consuming manner and a new workpiece has to be chucked. The chucking and the withdrawal as well as the reciprocatory machining operations require a considerable time.

It is, therefore, an object of the present invention to provide a machine of the general type set forth above by means of which workpieces can be machined continuously and successively at least unilaterally, but preferably bilaterally or on more sides.

It is another object of this invention to provide a machine as set forth in the preceding paragraph in which the workpieces are fed to the machine one after the other while when reaching the machining unit or units, the machining program determined by the templet or templets pertaining to each workpiece or workpiece group will start at a predetermined point.

It is still another object of this invention to provide a machine as set forth above which will make it possible in a simple manner to change the machining programs or to vary the same in conformity with workpieces of different length.

Still another object of this invention consists in the provision of a machine as set forth in the preceding paragraphs which will be simple in construction.

Figure 5:
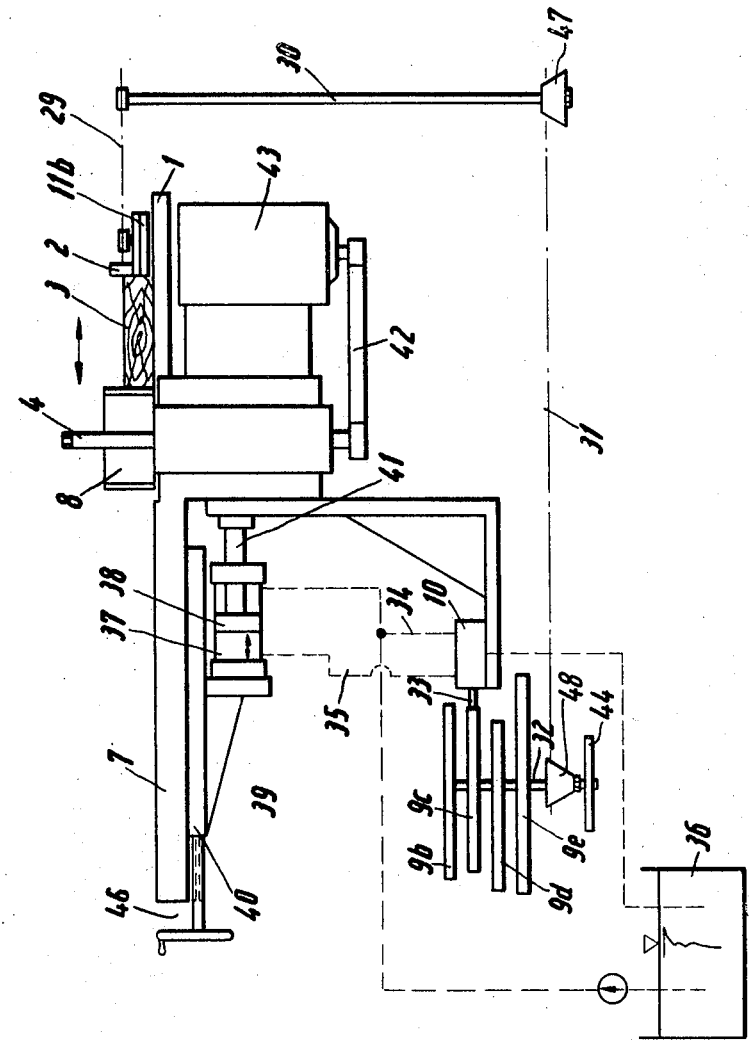
Figure 6:
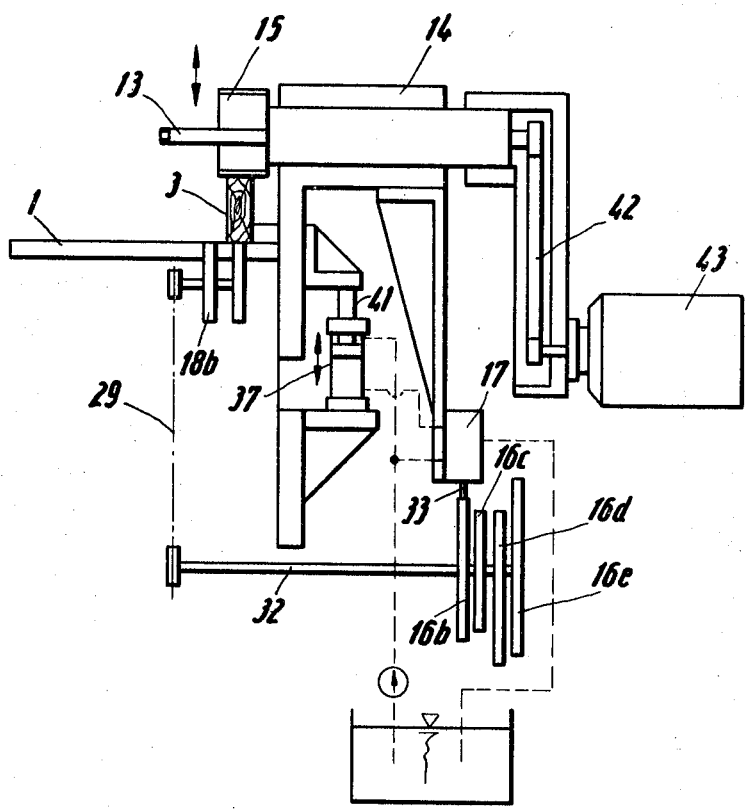

These and other objects and advantages of the invention will appear more clearly from the following specification in connection with the accompanying drawings, in which:

FIG. 1 is a side view of a machine according to the present invention.
FIG. 2 is a top view of the machine shown in FIG. 1.
FIG. 3 is a side view of a modified machine according to the present invention.
FIG. 4 is a top view of the machine of FIG. 3.
FIG. 5 is a view of a working spindle unit with vertical working spindle as seen in the workpiece feeding direction.
FIG. 6 shows a working spindle unit with a horizontal upper spindle as seen in workpiece feeding direction.

The machine according to the present invention for copying and longitudinally machining workpieces of wood or similar material with at least one working spindle within the workpiece receiving range, in which the copying movement of the working spindle is controlled by a movable templet through the intervention of a control device controlling a feeler, is characterized in that in the path of movement of the workpiece there is provided at least one, for instance a mechanical, driving member such as a roller, which driving member is drivingly connected to said templet. In this way, the templet is moved directly in conformity with the position of the workpiece on the workpiece guiding means so that also the copying movements of the working spindle are effected in direct conformity with this position so that a precise machining of the workpiece will be assured. When a raw workpiece which, for purposes of saving material, may be precut to approximately its eventual shape, is fed to the machine, the said workpiece moves against the roller and rotates the same so that immediately the copying movements of the working spindle will start.

It is particularly advantageous to design the templet in the form of a rotatably journalled and preferably detachable cam because it will then be possible to drivingly connect the templet in a simple manner to the driving member, such as a roller, and will require little space.

In order to be able to carry out different machining programs directly in succession, a plurality of different cams are arranged adjacent to each other on a rotatable shaft, said cams and/or the feeler or the control device advantageously being adjustable relative to each other in the direction of the axis of said cams.

According to a further feature of the invention, the roller the circumferential portion of which preferably consists of rubber or another material with similar friction, is through a transmission, such as a chain transmission, drivingly connected to the templet whereby a precise positive driving connection is established between the driving member and the templet. The transmission is preferably designed as adjustable transmission, for instance as a gear change transmission, so that it will be possible to drive the respective templet or cam at different transmission ratios for machining workpieces of different length.

The control device may be designed as mechanical control device. However, it is also possible and advantageous to have the feeler in driving connection with a pneumatically or hydraulically operable control device.

A particularly advantageous further development of the present invention consists in that the templet is connected with a returning device, for instance a spring, which returns the templet to its starting position at the end of a machining phase and which returns the templet to its starting position when the driving member is freed by the workpiece after it has performed a certain stroke so that a new workpiece or a new workpiece group can be fed into the machine and the machining program can start again.

The machine according to the present invention can be further structurally simplified and the machining of the workpiece is possible while the workpieces move continuously, when the workpiece receiving table is fixed to the machine and is preferably provided with guiding grooves extending in the workpiece feeding direction. Advantageously, in this instance, there is provided a spindle by means of which complementary guiding grooves are milled into the workpiece so that the workpiece is laterally guiding in the guiding grooves of the workpiece table.

According to a further development of the invention, in the path of movement of the workpiece a preferably adjustable feeding device in the form of feeding rollers, transporting chains with followers, or the the like, is arranged on the machine table by means of which a precise and uniform feeding or advancing of the workpiece will be assured. The transporting device is preferably mechanically, pneumatically or hydraulically adjustable relative to the workpiece for adjusting the machine in conformity with different workpiece dimensions.

According to a further feature of the present invention, a plurality of working spindles are provided for machining the workpiece on two or more sides, especially four sides. In such an instance, expediently the following spindle arrangement is selected. At the start there is provided the horizontal spindle by means of which the guiding grooves are milled. This spindle is arranged below the table and machines the bottom side of the workpiece and, as the case may be, provides the workpiece with guiding grooves. In the feeding direction behind the said last mentioned spindle, on both sides there are provided shaping spindles for the bilateral machining of the workpiece. Between the shaping spindles and the first mentioned spindle which may be called the trimming spindle, it is possible on at least one side to provide a preferably vertical jointing spindle or articulated spindle by means of which workpieces are machined which are guided laterally on an abutment rail. The vertical shaping spindles are followed by an upper horizontal shaping spindle, namely a so-called thickness spindle by means of which the shaping of the workpiece top side is effected. Finally, at the end there is provided a lower horizontal shaping spindle for finish machining the bottom side of the workpieces, by means of which, as a rule, the first milled-in guiding grooves or the webs therebetween are removed.

According to a simple embodiment of the machine according to the present invention, which expediently has a smooth workpiece table, preferably the following spindle arrangement is provided. At the start of the workpiece table there is provided below the table a horizontal trimming spindle by means of which the resting side of the workpiece is machined. This spindle is followed by at least one vertical jointing spindle located on one side of the workpiece table for machining that side of the workpiece which engages an abutment. Behind the jointing spindle on the other side of the table there is provided a vertical shaping spindle which is followed by a horizontal upper shaping spindle.

The machine according to the present invention is built up in conformity with the so-called building block principle so that for complicated machining operations a plurality of similar spindle units with copying units pertaining thereto may be serially arranged for a stepwise shaping operation.

The machine according to the present invention may also be employed as trimming, jointing or grooving machine when the working spindles are adjustable independently of the control devices.

Referring now to the drawings in detail, FIGS. 1 and 2 show a machine according to the present invention with a horizontal machine table 1 connected to the machine frame, which table 1 on one side thereof has a lateral abutment rail 2 for guiding the workpieces 3 to be machined.

Oppositely located with regard to the guiding rail 2 is a working spindle 4 with a vertical axis which is movable by means of a carriage 7 in a cutout 5 of the table perpendicularly with regard to the feeding direction indicated by an arrow 6.

The transverse movement of the working spindle 4 is, as diagrammatically illustrated in FIG. 2, controlled by a cam 9, which latter when rotating acts upon the carriage 7 through the intervention of a control device 10.

In the path of movement of the workpiece there are provided two rollers 11 which are driven by the workpiece and which in the particular embodiment shown in the drawing are located in feeding direction (arrow 6) ahead of and behind the working spindle 4.

Roller 11 is through a transmission drivingly connected to the cam 9 so that the latter will in direct conformity with the position of the workpiece 3 turn toward the tool 8 whereby the tool movement is effected accordingly directly by the workpiece 3.

Above the table 1, advantageously on both sides of the working spindle 4, there are provided transporting rollers 12 which are axis-parallel to the driving rollers 11. By means of said transporting rollers 12 the workpiece 3 is moved in feeding direction (arrow 6) past the working spindle 4. It is also possible to provide the driving rollers 11 between the transporting rollers 12. Furthermore, it may be advantageous to provide the transporting rollers 12 on that side of the workpiece which is located opposite to the guiding rail 2.

In the feeding direction indicated by the arrow 6, there is behind the vertical working spindle 4 arranged a further working spindle 13 with horizontal axis which is located above the table 1. The working spindle 13 is mounted on a carriage 14 which is displaceable perpendicularly with regard to the table plane and carries a miller 15. The carriage 14 is in the manner described above through the intervention of a control device 17 and by a rotatable cam 16 moves perpendicularly to the feeding device indicated by the arrow 6 and toward the table plane while the cam 16 is driven through the intervention of a transmission not shown by a roller 18 in the path of movement of the workpiece 3, a plurality of transporting rollers 19 for the workpiece 3 being arranged in the vicinity of the roller 18.

According to the embodiment illustrated in FIGS. 3 and 4, the workpiece table is provided with parallel grooves 20 extending in the feeding direction indicated by the arrow 6, said grooves 20 serving for guiding workpieces the bottom side of which is provided with complementary grooves. For purposes of producing the said grooves, below the table 1 at the start thereof there is provided a horizontal spindle 21 which carries a non-illustrated cutter for producing the grooves on the workpieces and which, according to the embodiment shown, has not associated therewith a copying unit. Within the range of the spindle 21, the table 1a has a corresponding cutout 22.

In the feeding direction indicated by the arrow 6, the spindle 21 is followed by a vertical jointing spindle 23 which similar to the spindle 21 is adjustable perpendicularly to the direction of its axis and perpendicularly to the feeding direction indicated by the arrow 6 and serves for the lateral machining of workpieces of which that side engaging an abutment is straight.

The spindle 23 which is located in a cutout 5a of the table 1a is followed by a left-hand shaping spindle 4a provided in the oppositely located cutout 5a. Spindle 4a is together with the carriage 7a through a control device 10a and a cam disc 9a adapted to be influenced as to its position, said cam disc 9a being driven by roller 11a. The left-hand shaping spindle 4a is in the feeding direction indicated by the arrow 6 followed by a right-hand shaping spindle 20a which is located in a cutout 5a and which is likewise adapted through the intervention of a copying device working in the manner described above to be moved perpendicularly to the axis of rotation thereof and perpendicularly to the feeding direction indicated by the arrow 6.

Adjacent to the said shaping spindle 20a there is located a horizontal upper shaping spindle 13a acting as thickness machining spindle which together with its carriage 14a is controlled through the intervention of the control device 7a by cam 16a which latter is driven by roller 18a. The last machining unit is formed by a horizontal lower shaping spindle 24 in a cutout 25 of the table 1a. The said spindle 24 is controlled by a copying unit working in the manner described above. The spindle 24 serves for finish machining the bottom side of the workpiece.

As will also be evident from FIGS. 3 and 4, below the table 1a there is provided at least one circulating transport chain 26 which extends over the entire length of the table. Each chain 26 expediently extends into a groove 20 of the table 1 and comprises followers so that the workpieces are carried along in the feeding direction indicated by the arrow 6. Above the table there are provided counterpressure rollers 27 which are arranged one behind the other including means for adjusting said rollers toward and away from the feed path, respectively. Any conventional device can be provided such as a setting arrangement including a hand wheel provided on a threaded spindle 45 which can be adjusted vertically.

FIG. 5 shows a vertical working spindle 4 and a copying device associated therewith. The workpiece 3 which engages the abutment or guiding rail 2 and in feeding direction is moved on the table 1 drives a rotatable roller 11b located on the side of the rail 2 and rotatable about a vertical axis. Roller 11b drives an intermediate shaft 30 through the intervention of a chain drive 29. The intermediate shaft 30 in its turn through a chain drive 31 drives a floatingly journalled plug shaft 32 having easily detachably mounted thereon side by side a plurality (in the particular example shown four) of different cam discs 9b, 9c, 9d, 9e. The cam discs 9b–9e have on the control device 10 associated therewith a feeler 33 which is mounted for plane parallel movement with regard to the cam discs and is adapted to actuate for instance at least one valve of the control device 10. The control device 10 and the cam discs 9b–9e are adjustable relative to each other in a direction parallel to the axes thereof so that the feeler 33 may selectively be brought into operative engagement with one of said cam discs. Means for returning template means to a predetermined starting position at the end of a machining operation are provided. Any conventional device can be used such as a coaxial spring 44 which after release of the rotatable roller 11b assures being returned to starting position by way of cam discs 9b–9e. These cam discs as adjustable are adjunct to an adjustable speed transmission for adjusting drive relationship. Any conventional adjustable speed transmission can be provided such as tapered conically shaped drive rolls 47, 48 converging in opposite directions, so that, the belts forming connecting members can be displaced axially. Two conduits 34, 35 of the control device 10 connected to a source of power, as for instance a source 36 of pressure, lead to a working cylinder 37 and, more specifically, to one of the cylinder chambers separated by a piston 38. The cylinder 37 is fixedly mounted to a frame 39 which carries the control device 10. The machine includes headstocks adjustable independently of the automatic control device. Any conventional means for adjusting the headstock can be provided such as a threaded spindle 46 carrying a hand wheel with guiding means 40 for the carriage 7 of the working spindle 4. The piston rod 41 of the piston 38 is connected to the carriage 7 so that the latter may be displaced back and forth transverse to the feeding direction and perpendicularly to the axis of the working spindle 4.

As soon as the workpiece 3 moves against the roller 11b, the latter is carried along so that through the transmission 29–31 it will drive the shaft 32 and thereby the cam discs 9b–9e. The respectively selected cam disc 9c will then control the control device 10 in such a manner that depending on the shape of the cam disc 9c, oil or another pressure medium will be pressed into one or the other cylinder chamber of cylinder 37 with the result that the carriage 7 with the working spindle 4 will be reciprocated in conformity with the cam disc 9c. By means of the cutout 8, a profile corresponding to the circumferential shape of cam disc 9c is produced on one side of the workpiece 3. The working spindle is driven by a motor 43 and a belt drive 42, said motor being mounted below the table 1 on carriage 7.

In conformity with FIG. 6, the embodiment shown therein has the upper horizontal working spindle 13 which is journalled on the vertically displaceable carriage 14 driven by a motor 43 through the intervention of a belt drive 42. Below the workpiece table 1 there are provided follower rollers 18b which through the intervention of the workpiece 3 moving in feeding direction and through a chain drive 29 directly drive the shaft 32 on which four cam discs 16–16e are arranged adjacent to each other. The machine frame has fixedly connected thereto the control device 17 with the feeler 33 which control device similar to the embodiment of FIG. 5 is drivingly connected to a cylinder 37 the piston rod 41 of which acts upon the carriage 14 so that the latter is displaced back and forth in conformity with the circumferential shape of the cam 16b.

Instead of employing a driving roller which through a transmission is operatively connected to the cam disc, also a feeler may be provided, for instance in the form of a roller, which controls a drive which is drivingly connected to the cam disc. In such an instance an increase in the driving output for the cam disc can be obtained.

It is, of course, to be understood that the present invention is, by no means, limited to the particular constructions shown in the drawings but also comprises any modifications within the scope of the invention.

What is claimed is:

1. An apparatus for machining rail-like members, such as wood rails, to impart a longitudinally varying profile thereto, said apparatus comprising; a frame, means for feeding rail members in the direction of the length thereof along said frame, means for guiding said members along a predetermined feed path, headstock means comprising at least one headstock with a driven spindle, means guiding said headstock for movement toward and away from said feed path, servomotor means connected to said headstock and including a control feeler, template means engaging said feeler, support means supporting said template means for movement thereof in a predetermined direction relative to said feeler to move different regions of the template means into engagement with the feeler, and means engaging a rail to be machined by a tool on said spindle and driven by the rail and means operatively connecting said means driven by said rail to said support means for said template means to drive said template means in said predetermined direction.

2. An apparatus according to claim 1 in which said support means supporting said template means is a shaft and said template means when moving in said predetermined direction rotates.

3. An apparatus according to claim 2 in which said template means comprises a plurality of templates on such shaft adapted for selective registration with said control feeler.

4. An apparatus according to claim 3 in which said templates are adjustable axially on said shaft to bring them into selective registration with said control feeler.

5. An apparatus according to claim 1 in which said means driven by the rail is a roller having friction material on the periphery thereof, and said means connecting said roller with said shaft comprises a transmission.

6. An apparatus according to claim 5 in which said transmission is an adjustable speed transmission.

7. An apparatus according to claim 5 in which said roller is positioned close to the tool carried by said spindle.

8. An apparatus according to claim 7 in which said roller engages the side of the rail opposite the side engaged by the tool.

9. An apparatus according to claim 1 in which said servomotor means includes a mechanical device.

10. An apparatus according to claim 9 in which said servomotor means includes a fluid operable device.

11. An apparatus according to claim 1 which includes means for returning said template means to a predetermined starting position at the end of a machining operation.

12. An apparatus according to claim 1 in which said means for guiding said members along said feed path comprising a table stationarily arranged on said frame and supportingly engaging the rails from beneath and including means engaging the rails laterally to prevent lateral movement of the rails relative to said feed path.

13. An apparatus according to claim 12 in which said last mentioned means comprises guiding grooves formed in said table and adapted for engagement tongues formed on the bottom of the rails being advanced along said feeding path.

14. An apparatus according to claim 1 in which said means for feeding rail members along said feed path comprises feeding rollers engaging the rails from above.

15. An apparatus according to claim 1 in which said means for feeding rail members along said feed path comprises a chain beneath said feed path and drive members on the chain engaging the rails.

16. An apparatus according to claim 14, which includes means for adjusting said rollers toward and away from said feed path.

17. An apparatus according to claim 1 in which said headstock means comprises a plurality of headstocks each having spindles therein and distributed along the length of the frame of said apparatus and operable for profiling two or more sides of rail members moving along said feed path.

18. An apparatus according to claim 17 in which said headstocks are substantially identical.

19. An apparatus according to claim 18 in which said headstocks are adjustable independently of the automatic control devices pertaining thereto.

20. An apparatus according to claim 10 in which said fluid operable device comprises a cylinder stationary in the machine frame, and a piston reciprocable in the cylinder and connected to the pertaining headstock.

21. An apparatus according to claim 18 in which said frame of the apparatus comprises lateral cut-outs for accommodating said headstocks.

References Cited
UNITED STATES PATENTS

| | | | |
|---|---|---|---|
| 2,851,071 | 9/1958 | Schils | 144—144 |
| 3,295,570 | 1/1967 | Olbrich | 144—144 X |

GIL WEIDENFELD, Primary Examiner